Patented Jan. 9, 1951

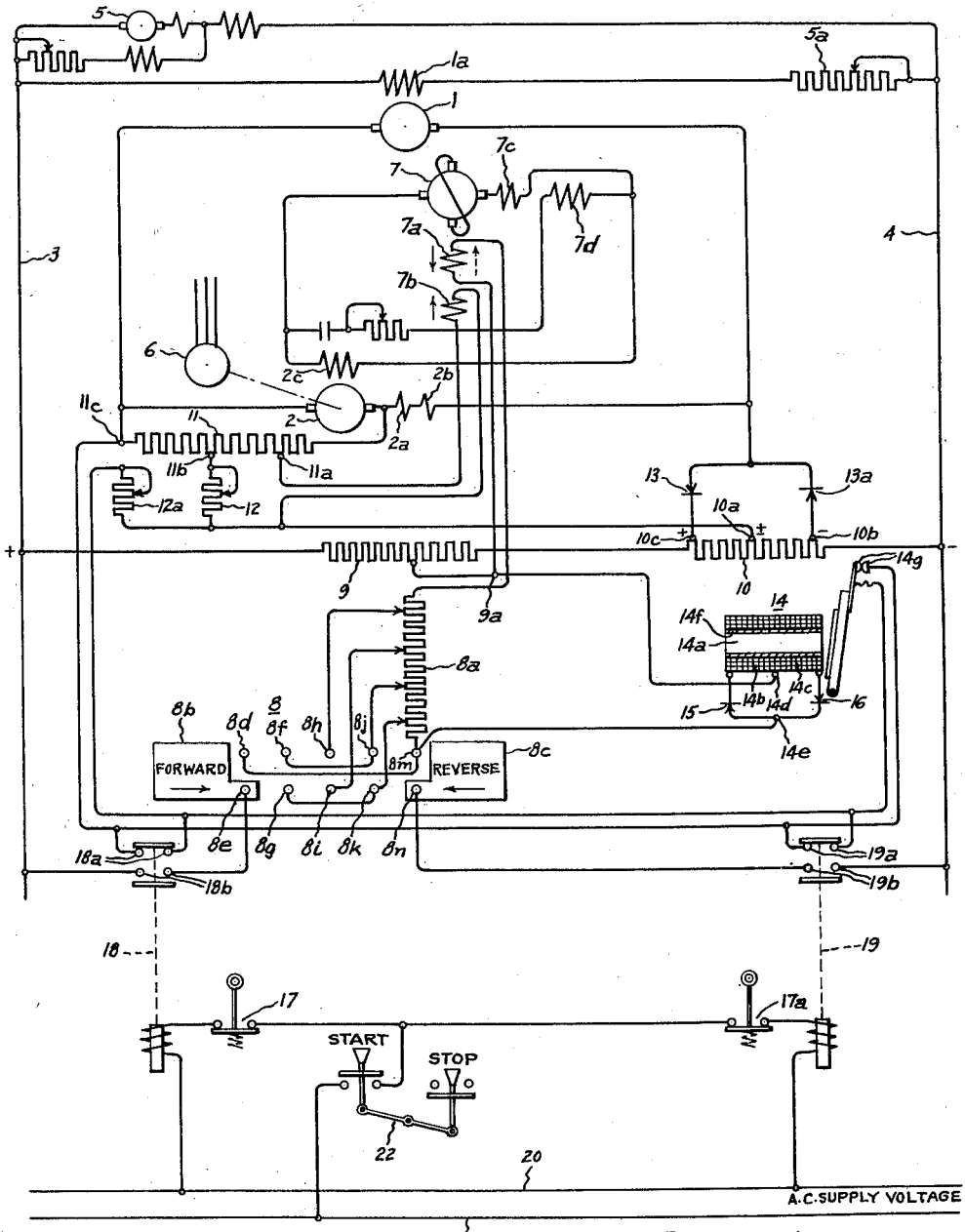

2,537,794

UNITED STATES PATENT OFFICE 2,537,794

REVERSING MOTOR CONTROL SYSTEM

George E. Shaad, Schenectady, Harold B. La Roque, Scotia, and Robert B. Moore, Schenectady, N. Y., assignors to General Electric Company, a corporation of New York Application April 22, 1949, Serial No. 89,046

4 Claims. (Cl. 318—141)

This invention relates to control systems, more particularly to systems for controlling the operation of electric motors, and it has for an object the provision of a simple, reliable, inexpensive and improved control system of this character.

More specifically the invention relates to motor control systems in which the motor is supplied from an adjustable voltage generator and in which the motor must be frequently reversed by reversal of the generator voltage. In certain drives, such, for example, as a log carriage drive in a saw mill, the motor is reversed as often as once every three seconds. This is accomplished by manipulation of a reversing type master switch to reverse the excitation of the supply generator. In a drive of this character it is desired to neutralize the residual magnetism of the generator to prevent creepage of the carriage when the master switch is moved to the off position to stop the drive. For this purpose a relay is provided which is responsive to a voltage that is derived from the master switch circuit. The relay operates when the master switch is moved in the off position. However, it is not necessary to neutralize the residual magnetism during reversals. Consequently, if the relay operates each time the master switch is operated through the off position during a reversal, many thousands of unnecessary operations of the relay will occur in a day and its useful life will be correspondingly reduced. Accordingly, a further object of the invention is the provision of a control system which will prevent these devices from operating when the master switch is moved through the off position during reversals but which cause the relay to operate to neutralize the generator field when the master switch is moved to and left in the off position to stop the drive.

In carrying the invention into effect in one form thereof, a time delay relay is provided for responding to a voltage derived from the master switch circuit to effect the operation of the means which neutralizes the residual magnetism of the generator. The time delay is sufficient to prevent the relay from dropping out in the short interval that the master switch is in the off position during a reversal, but allows the relay to drop out when the master switch is left in the off position for a period which exceeds the time delay setting of the relay. Means are also provided for preventing the reversal of the flux in the core of the relay in response to reversal of the voltage derived from the master switch circuit since such reversal of the flux would cause the relay to drop out.

For a better and more complete understanding of the invention, reference should now be had to the following specification and to the accompanying drawing, of which the single figure is a simple diagrammatical illustration of an embodiment of the invention.

Referring now to the drawing, a D.-C. motor 1 is supplied from an adjustable voltage generator 2 with the armature of which the armature of the motor 1 is connected to a loop circuit which includes the generator's commutating field windings 2a and 2b. The motor is coupled to drive a reversing load (not shown) such, for example, as the log carriage of a saw mill. It is provided with a separately excited field winding 1a, which is connected across the excitation supply buses 3 and 4 to which a substantially constant voltage is supplied from an exciter 5. A variable resistor 5a is included in circuit with the field winding.

The generator 2 is driven at a speed which is substantially constant by suitable means such as an induction motor 6. The generator is provided with a separately excited field winding 2c, which is supplied from an exciter, such as the amplidyne 7. The amplidyne is provided with a reference field winding 7a, an opposing control field winding 7b, a compensating field winding 7c, and an anti-hunt field winding 7d. It is driven by any suitable constant speed driving means, such as an induction motor. Preferably, it is driven by the induction motor 6 which drives the supply generator.

For the purpose of controlling the speed and direction of rotation of the motor 1, a reversing type master switch 8 is provided. It directly controls the strength and polarity of magnetization of the control field winding 7a, thereby to control the strength and polarity of the generator field 2c and the magnitude and polarity of the generator voltage. The master switch comprises a resistor 8a, movable forward and reverse power segments 8b and 8c, and a plurality of cooperating stationary fingers 8d–8m, inclusive. The forward segment 8b is connected through finger 8e to the positive excitation bus 3 and the reverse power segment 8c is connected to the negative excitation bus 4. The lower terminal of the resistor 8a is connected to the first position forward and reverse fingers 8d and 8m.

Across the excitation buses 3 and 4 two resistors 9 and 10 are connected in series relationship with each other. Between an intermediate point on the resistor 9 and the upper terminal of the master switch speed varying resistor 8a is connected the reference field winding 7a.

In the first position forward of the master switch the circuit of the reference field winding is traced from the positive bus 3 through the forward power segment 8b, finger 8d, resistor 8a, reference field winding 7a and resistors 9 and 10 to the negative bus 4. The polarity of magnetization of the reference field winding is represented by a solid arrow. Similarly in the first position reverse of the master switch, the circuit of the reference field winding is traced from the positive excitation bus 3 through resistor 9, reference field winding 7a, resistor 8a, finger 8m, and reverse power segment 8c to the negative bus 4. The polarity of the flux of the reference field winding for this reverse connection is indicated by a dotted line arrow. It will be noted that movement of the master switch through successive forward or reverse positions short-circuits an increasing portion of the resistor 8a, thereby producing successive increases in the magnetization of the reference field winding.

A resistor 11 is connected across the armature terminals of the supply generator 2. Between a point 11a near the right hand terminal of this resistor and an intermediate point 11b, the control field winding 7b of the amplidyne is connected in series relationship with an adjustable resistor 12. Thus there is derived from the armature voltage of the generator a voltage which is supplied to the control field winding. The polarity of the control field winding, which is indicated by a solid arrow, is such that its magnetization opposes the magnetization of the reference field winding.

For the purpose of limiting the current in the armature circuit of the supply generator and motor to a maximum permissible value, the voltage drop across the commutating field windings 2a and 2b is compared with the voltage drop across a selected portion of resistor 10. When the voltage across the commutating fields exceeds the voltage across the selected portion of the resistor 11, the magnetization of the control field winding 7b is augmented thereby to reduce the magnetization of the supply generator sufficiently to reduce the armature current to the maximum permissible value. This comparison circuit comprises reversely connected blocking rectifiers 13 and 13a connected between a terminal of the field winding 2b and positive and negative terminals of the resistor 10, together with a connection between an intermediate point of resistor 10 and the lower terminal of control field winding 7b. If the voltage across the field windings 2a and 2b exceeds the voltage between the points 10a and 10b when the left-hand terminal of field winding 2a is positive, an additional component of current will be caused to flow through the control field winding 7b in the direction of the arrow to point 10a, point 10b and thence through rectifier 13a to the right-hand terminal of field winding 2b. If the right-hand terminal of field winding 2b is positive and the voltage drop across the field windings 2a and 2b exceeds the voltage between the points 10c and 10a, the current flow is through rectifier 13, point 10c, point 10a, through field winding 7b in the reverse direction.

For the purpose of neutralizing the residual magnetism of the generator, a relay 14 is provided. This relay has a core member 14a which is provided with a winding that is divided into sections 14b and 14c by an intermediate tap 14d. This intermediate tap is connected to the point 9a which constitutes a terminal of the reference field winding 7a. The outer terminals of the winding sections 14b and 14c are connected through rectifiers 15 and 16 to the common point 14e which is directly connected to the finger 8m of the master switch. Thus the winding sections 14b and 14c are connected in parallel with a portion of the reference field winding circuit. As shown, the rectifiers 15 and 16 are reversely connected with respect to the terminals 9a and 8m so that only one of the winding sections 14b and 14c is energized at one time. When the terminal 9a is positive with respect to finger 8m current flows through winding section 14c and rectifier 16 and when the finger 8m is positive, current flows through rectifier 15 and winding section 14b. Owing to the reverse connection of the rectifiers 15 and 16, the polarity of the flux produced in the core by the winding sections 14b and 14c is always the same irrespective of the polarity of the voltages at the terminals 9a and 8m. The core of the relay is provided with a copper jacket which delays the decay of flux in the core member and thus provides a time delay in the dropout operation of the relay.

The relay 14 is provided with normally closed contacts 14g which complete a circuit from the left-hand terminal 11c of resistor 11 through resistor 12a to the lower terminal of control field winding 7b. Thus when the relay is deenergized and the contacts 14g are closed, substantially the entire armature voltage of the supply generator is applied to the control field winding 7b to neutralize the residual magnetism of the generator.

Overtravel of the carriage in either direction is prevented by forward and reverse limit switches 17 and 17a. For the purpose of preventing creeping in the limit zones after operation of the limit switches, relays 18 and 19 are provided. The operating coils of relays 18 and 19 are respectively connected in series with the contacts of limit switches 17 and 17a. These relays have normally closed contacts 18a and 19a, which are connected in parallel with the normally closed contacts 14g of the neutralizing relay 14. Thus when either limit switch is open one or the other of the contacts 18a or 19a is closed to complete a circuit for increasing the excitation of the control field winding 7b to neutralize the residual magnetism of the supply generator.

The limit switches 17 and 17a and the coils of relays 18 and 19 are arranged to be connected to a source of supply, such as represented by supply lines 20 and 21, by means of a suitable push button switch accessory 22.

With the foregoing understanding of the elements and their organization, the operation of the system will readily be understood from the following detailed description.

Assuming the master switch to be in the off position and the log carriage to be at rest in some position between the limit switch zones, the system is prepared for operation by depressing the start push button switch thereby to complete energizing circuits for the operating coils of relays 18 and 19. Responsively to energization, relays 18 and 19 open their normally closed contacts 18a and 19a and close their normally open contacts 18b and 19b, respectively. To effect operation of the motor 1 to advance the log carriage in the forward direction, the master switch is moved from the off position through the five forward positions in succession. In the first forward position of the master switch the reference field winding 7a is connected across the excitation source 3 and 4 with the full amount of the resistor 8a in series. Consequently the reference field 7a is weakly energized thereby causing the amplidyne 7 to supply a low voltage to the field winding 2c of the supply generator which supplies a voltage to the armature of the motor 1 causing it to accelerate from rest. In response to the voltage across the reference field winding 7a and the resistor 8a, current flows through the winding section 14c of the neutralizing relay and rectifier 16, thereby causing the relay to pick up and open its normally closed contacts 14g. The opposing control field winding is now connected in series with resistor 12 across the portion of resistor 11 between points 11a and 11b. As the voltage of the generator rises, the excitation of the opposing control field winding is correspondingly increased thereby reducing the net excitation of the amplidyne until a balanced condition is reached. As the master switch is moved through its successive forward positions, successive portions of the accelerating resistor 8a are short-circuited, thereby increasing the excitation of the reference field winding and correspondingly increasing the armature voltage of the generator and the speed of the motor. The rising generator voltage increases the excitation of the opposing control field winding until a final balanced condition is reached in which the motor is operating at full speed. At the end of the cut the operator reverses the motor by a rapid movement of the master switch from the full speed position forward to the full speed position reverse.

As the master switch moves through the successive forward positions to the off position, the excitation of the reference field is decreased in each position, thereby correspondingly decreasing the voltage of the generator so that the motor is decelerated by regenerative braking. In the off position of the master switch the winding section 14c of the neutralizing relay is deenergized. However, owing to the copper jacket flux is maintained in the core member 14a of the neutralizing relay during the interval in which the master switch is passing through the off position and consequently the relay does not drop out.

In the first position reverse of the master switch, current flows through the resistor 8a and the reference field winding 7a in the reverse direction so that the polarity of the excitation of the reference field winding is reversed. Owing to the reversal of the polarity of the reference voltage across the reference field winding current flows through the rectifier 15 and winding section 14b. However, the direction of flux produced in the core 14a by the winding section 14b for the forward polarity of the reference voltage is the same as that produced by the winding section 14c for the reverse polarity of the reference voltage. Consequently the relay does not drop out when the reference voltage is reversed by movement of the master switch to the reverse position since reversal of the voltage does not produce a reverse of the flux.

As the master switch is moved through the successive positions reverse, the motor is accelerated to full speed in the reverse direction in a manner similar to that described for the acceleration in the forward direction.

To stop the log carriage the master switch is returned to the off position. As a result the motor is rapidly decelerated to a very low speed as the master switch is moved toward the off position. In the off position of the master switch the power segments 8b and 8c are disengaged from the fingers 8d and 8m and the reference field winding 7a is deenergized. Responsively to the disappearance of the reference voltage between terminal 9a and finger 8m, current ceases to flow in the previously energized winding section of the neutralizing relay 14. The copper jacket retards the decay of flux in the core 14a so that the relay is maintained picked up for a predetermined interval of time. At the expiration of this time interval, the relay drops out and closes its normally closed contacts 14g to complete the connection of the opposing control field winding 7b across the points 11a and 11c of the resistor 11. As a result substantially the entire armature voltage of the generator is applied to the circuit of the control field winding and the current through the control field winding is greatly increased. Since the reference field winding 7a is deenergized, the voltage of the amplidyne is reversed thereby forcing the generator field flux to decay substantially to zero. Thus the residual magnetism is substantially entirely neutralized and the tendency of the carriage to creep is eliminated.

If the carriage is driven into one of the limits, the corresponding limits switch is opened thereby deenergizing the corresponding limit switch relay 18 or 19 and causing it to open contact 18b or 19b to deenergize the reference field winding and effect a rapid deceleration of the motor. Simultaneously the deenergized limit switch relay closes the normally closed contact 18a or 19a to complete the neutralizing connection of the control field winding 7b to the points 11a and 11c of the resistor 11 to destroy the residual magnetism of the generator.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What we claim as new and desire to secure by Letters Patent of the United States is:

1. A reversing control system comprising an adjustable voltage generator provided with a field winding, an electric motor supplied from said generator, a source of direct voltage, a reversing type master switch having an off position and forward and reverse operating positions for deriving from said source a direct voltage in response to operation of said switch to said forward position and a voltage of reverse polarity in response to operation of said switch to said reverse position, means responsive to said direct voltages for controlling the excitation of said field winding, a time delay drop-out relay having a core member provided with a winding divided into two sections, connections for supplying said direct voltages to said winding sections in parallel, reversely connected rectifiers in circuit with said winding sections to prevent reversal of the flux in said core member in response to reversal of said master switch and to provide maintaining said relay picked up as said master switch passes through said off position during a reversal, and connections completed in response to drop out of said relay for deriving a voltage from the armature voltage of said generator to neutralize the residual magnetism of said generator.

2. A reversing control system comprising an adjustable voltage generator provided with a field winding, an electric motor supplied from said generator, a source of direct voltage, a reversing type master switch having an off position and forward and reverse operating positions, connections established in one of said operating positions for deriving a direct voltage from said source and in the other of said operating positions for deriving from said source a voltage of reverse polarity, means responsive to said direct voltages for controlling the excitation of said field winding, a relay having a core member provided with a winding divided into two sections, connections for supplying said direct voltages to said winding sections in parallel, reversely connected rectifiers in circuit with said winding sections to prevent reversal of the flux in said core member in response to reversal of said master switch, said relay having time delay in its drop-out operation to maintain said relay picked up as said master switch passes through said off position during a reversal and to provide for drop-out of said relay in response to maintaining said master switch in said off position for the period of said time delay, and connections completed in response to the drop-out operation of said relay to derive a voltage from the armature voltage of said generator to neutralize the residual magnetism of said generator.

3. A reversing control system comprising an adjustable voltage generator provided with a field winding, an electric motor supplied from said generator, means for supplying excitation current to said field winding comprising an amplidyne provided with a reference field winding and with an opposing control field winding, a source of direct voltage, a reversing type master switch having an off position and forward and reverse operating positions, connections established in said forward operating position for deriving a direct voltage from said source and connections established in said reverse operating position for deriving from said source a direct voltage of reverse polarity, connections for selectively supplying either of said derived voltages to said reference field winding to effect rotation of said motor in a corresponding direction, a relay having a core member provided with a winding divided into two sections, connections for supplying to said winding sections in parallel the voltage supplied to the circuit of said reference field winding, reversely connected rectifiers in circuit with said winding sections to prevent reversal of the flux in said core member and drop-out of said relay in response to reversal of said master switch, said relay having time delay in its drop-out operation to maintain said relay picked up as said master switch is moved through said off position during a reversal and to provide for drop-out of said relay in response to said master switch remaining in said off position longer than the period of said time delay, and connections completed in response to the drop-out operation of said relay from the armature circuit of said generator to said opposing control field winding for supplying thereto a voltage to neutralize the residual magnetism of said generator.

4. A reversing control system comprising an adjustable voltage generator provided with a field winding, an electric motor supplied from said generator, means for supplying excitation current to said field winding comprising an amplidyne provided with a reference field winding and with an opposing control field winding, a source of direct voltage, a reversing type master switch having an off position and forward and reverse operating positions, connections established in said forward operating position for deriving a direct voltage from said source and connections established in said reverse operating position for deriving from said source a direct voltage of reverse polarity, connections for selectively supplying either of said derived voltages to said reference field winding to effect rotation of said motor in a corresponding direction, a resistor connected across the armature of said generator, connections for supplying to said control field winding a voltage derived from the voltage across a portion of said resistor, a relay having a core member provided with a winding divided into two sections, connections for connecting said winding sections in parallel with each other in a circuit that is in parallel with the circuit of said reference field winding, reversely connected rectifiers in circuit with said winding sections to prevent reversal of the flux in said core member and drop-out of said relay in response to reversal of said master switch, said core member being provided with a copper jacket to provide a time interval in the drop-out operation to maintain said relay picked up as said master switch is moved through said off position during a reversal and to provide for drop-out of said relay in response to said master switch remaining in said off position longer than the period of said time delay, and connections completed in response to drop-out operation of said relay from said resistor to said opposing field winding for supplying thereto a substantially greater voltage than the voltage derived from said portion of said resistor to neutralize the residual voltage of said generator.

GEORGE E. SHAAD.
HAROLD B. LA ROQUE.
ROBERT B. MOORE.

REFERENCES CITED

The following references are of record in the file of this patent:

UNITED STATES PATENTS

| Number | Name | Date |
|---|---|---|
| 2,330,993 | Perrine et al. | Oct. 5, 1943 |